US008814676B2

(12) United States Patent
De Courssou et al.

(10) Patent No.: US 8,814,676 B2
(45) Date of Patent: Aug. 26, 2014

(54) UNIVERSAL PLAYER CONTROL FOR CASINO GAME GRAPHIC ASSETS

(75) Inventors: Thierry Brunet De Courssou, Henderson, NV (US); Cameron Anthony Filipour, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1440 days.

(21) Appl. No.: 12/028,627

(22) Filed: Feb. 8, 2008

(65) Prior Publication Data

US 2008/0194326 A1 Aug. 14, 2008

Related U.S. Application Data

(60) Provisional application No. 60/889,260, filed on Feb. 9, 2007.

(51) Int. Cl.
*G06F 13/00* (2006.01)
*G07F 17/32* (2006.01)

(52) U.S. Cl.
CPC ............ *G07F 17/32* (2013.01); *G07F 17/3262* (2013.01)
USPC ............. 463/31; 715/834; 715/723; 345/156; 345/173

(58) Field of Classification Search
None
See application file for complete search history.

(56) References Cited

U.S. PATENT DOCUMENTS 4,551,717 A 11/1985 Dreher
4,554,419 A 11/1985 King et al.
4,764,666 A 8/1988 Bergeron et al.
5,739,809 A 4/1998 McLaughlin et al.
5,759,102 A 6/1998 Pease et al.
5,841,428 A 11/1998 Jaeger et al.
5,936,613 A 8/1999 Jaeger et al.
5,951,397 A 9/1999 Dickinson
5,966,125 A 10/1999 Johnson
5,990,885 A 11/1999 Gopinath
6,003,013 A 12/1999 Boushy et al.
6,028,604 A 2/2000 Matthews et al.
6,102,394 A 8/2000 Wurz et al.
6,110,041 A 8/2000 Walker et al.
6,113,495 A 9/2000 Walker et al.
6,134,103 A 10/2000 Ghanma
6,201,532 B1 3/2001 Tode et al.
6,293,866 B1 9/2001 Walker et al.

(Continued)

OTHER PUBLICATIONS

International Search Report mailed Jun. 12, 2008, in corresponding International Application No. PCT/US2008/001702, filed Feb. 8, 2008.

(Continued)

*Primary Examiner* — Paul A D'Agostino
(74) *Attorney, Agent, or Firm* — Neal, Gerber & Eisenberg LLP

(57) ABSTRACT

Universal Player Controls for regulated pay computer-controlled video games afford players an efficient, intuitive method for customizing the layout and appearance of their favorite electronic games. A popup control featuring a jog wheel for fast selection and geometric control using the touch screen may be attached to each predetermined group of graphic assets allowing players to move, resize, dim, animate, temporary hide or overlap them. Predetermined presentation styles (skins) may be successively rendered. Whereas the displays on the regulated pay computer-controlled video games of the prior art were often visually cluttered and not visually appealing to adult game console players, the present Universal Player Controls enables the players to tailor the game appearance then save it in a player profile for latter retrieval.

32 Claims, 6 Drawing Sheets

(56) References Cited

U.S. PATENT DOCUMENTS 6,343,988 B1 2/2002 Walker et al.
6,350,199 B1 2/2002 Williams et al.
6,448,987 B1 * 9/2002 Easty et al. ................... 715/834
6,631,522 B1 * 10/2003 Erdelyi ........................... 725/53
6,712,698 B2 3/2004 Paulsen et al.
6,722,985 B2 4/2004 Criss-Puszkiewicz
6,743,098 B2 6/2004 Urie et al.
6,860,810 B2 3/2005 Cannon
7,040,987 B2 5/2006 Walker et al.
7,046,230 B2 * 5/2006 Zadesky et al. ............... 345/156
7,083,520 B2 8/2006 Rowe
7,084,860 B1 8/2006 Jaeger et al.
7,113,175 B2 9/2006 Liu et al.
7,345,671 B2 * 3/2008 Robbin et al. ................ 345/156
7,499,040 B2 * 3/2009 Zadesky et al. ............... 345/204
7,710,394 B2 * 5/2010 Robbin et al. ................ 345/156
7,710,409 B2 * 5/2010 Robbin et al. ................ 345/184
7,716,603 B2 * 5/2010 Boyden ......................... 715/834
7,722,453 B2 5/2010 Lark et al.
7,753,789 B2 7/2010 Walker et al.
7,918,738 B2 4/2011 Paulsen
8,414,372 B2 4/2013 Cannon et al.
2001/0036858 A1 11/2001 McNutt et al.
2002/0050983 A1 5/2002 Liu et al.
2002/0083179 A1 6/2002 Shaw
2002/0141643 A1 10/2002 Jaeger
2002/0142815 A1 10/2002 Candelore
2002/0142825 A1 10/2002 Lark et al.
2002/0142846 A1 10/2002 Paulsen
2002/0147640 A1 10/2002 Daniele et al.
2002/0151366 A1 10/2002 Walker et al.
2003/0163399 A1 8/2003 Harper et al.
2003/0176218 A1 9/2003 LeMay et al.
2004/0107821 A1 6/2004 Alcalde et al.
2004/0139318 A1 7/2004 Fiala et al.
2004/0242324 A9 12/2004 Walker et al.
2005/0059458 A1 3/2005 Griswold et al.
2005/0113163 A1 5/2005 Mattice et al.
2005/0170890 A1 8/2005 Rowe et al.
2006/0095331 A1 5/2006 O'Malley et al.
2006/0189387 A1 8/2006 Rigsby et al.
2006/0194633 A1 8/2006 Paulsen
2006/0211493 A1 9/2006 Walker et al.
2006/0217200 A1 9/2006 Rowe
2006/0290530 A1 12/2006 Ivancic
2007/0011718 A1 1/2007 Nee
2007/0032949 A1 2/2007 Arai et al.
2007/0052691 A1 * 3/2007 Zadesky et al. ............... 345/173
2007/0072678 A1 3/2007 Dagres
2007/0155490 A1 7/2007 Phillips et al.
2007/0167229 A1 7/2007 LeMay et al.
2007/0203971 A1 8/2007 Walker et al.
2007/0236472 A1 * 10/2007 Bentsen et al. ............... 345/173
2008/0020845 A1 1/2008 Low et al.
2008/0032787 A1 2/2008 Low et al.
2008/0076548 A1 3/2008 Paulsen
2008/0146326 A1 6/2008 Morrow et al.
2008/0165141 A1 * 7/2008 Christie ........................ 345/173
2008/0224822 A1 9/2008 Gelman et al.
2008/0270579 A1 10/2008 Herz et al.
2010/0146393 A1 * 6/2010 Land et al. .................... 715/723
2010/0148442 A1 6/2010 Walker et al.
2010/0227664 A1 9/2010 Walker et al.
2010/0227684 A1 9/2010 Walker et al.
2010/0228606 A1 9/2010 Walker et al.
2011/0047014 A1 * 2/2011 De Angelo ................... 705/14.4

OTHER PUBLICATIONS

Written Opinion mailed Jun. 12, 2008, in corresponding International Application No. PCT/US2008/001702, filed Feb. 8, 2008.

* cited by examiner

UNIVERSAL PLAYER CONTROL FOR CASINO GAME GRAPHIC ASSETS

CROSS REFERENCE TO RELATED APPLICATIONS

This application claims the benefit under 35 U.S.C. §119 (e) of Provisional Application No. 60/889,260, filed Feb. 9, 2007, which application is hereby incorporated herein by reference in its entirety.

BACKGROUND OF THE INVENTION

1. Field of the Invention

The present invention relates generally to the field of regulated pay computer-controlled video games, either pay-for-play (e.g. entertainment arcades, amusement arcades) or pay-for-wager (e.g. casino, video lottery, Fixed Odds Betting terminals or FOBT).

2. Description of the Prior Art and Related Information

The primary gaming screens of conventional regulated pay computer-controlled video games are often quite cluttered, as they typically display a large number of buttons and meters. For instance, most slot machines have meters to display a player's credits, total bet, win, and the amount paid on their last game and buttons to allow players to cash out, access the game's menu, access the game's pay table, get help, select how many paylines to play, select the total amount wagered on each payline, to make a max bet, and to spin the reels. In addition to all of these buttons and meters, games must also feature their credit denomination prominently.

Players wagering on games of the prior art have no flexibility and are not afforded any functionality that would enable them to reduce the clutter of the gaming screen. Because these games rely on archaic technologies and designs, the placement of their buttons and meters is static and does not allow for player customization. As a result, players who are used to innovative and efficient product designs of the $21^{st}$ st century may be frustrated by their electronic casino game experience. As a result, casinos may fail to attract and retain the patronage of the younger demographic, if such young patrons come to believe that the games offered have no relevance to them.

As electronic casino games continue to evolve, further problems with the current game display and menu navigation strategies will arise. Games of the modern era are giving players increasingly more flexibility and options. If games must feature a button for each and every player option, their already cluttered screens will grow wholly unmanageable.

SUMMARY OF THE INVENTION

Regulated pay computer-controlled video games featuring the present Universal Player Control allow players to customize the appearance of their games using a method that is efficient, intuitive and visually appealing. By employing a simple, innovative design and jog wheel technology, the present Universal Player Controls allow players to quickly access and navigate menus and information at the touch of a finger, move and resize buttons and meters, and hide onscreen game assets that are not useful to them.

One of the distinguishing features of embodiments of the present Universal Player Control is its simplicity. Players may activate the Universal Player Control within each menu by pressing the "customize button" or a predetermined customize area on the display touch-screen. Then, a "flower-like" Universal Player Control popup may open on the display. By simply pressing the button at the center of the Universal Player Control, the player may move the Universal Player Control out of its parent (i.e., associated) window to any location on the gaming screen. Players may move the window associated with each Universal Player Control by pressing directional arrows on the Universal Player Control. In a multi-display gaming machine, players may move the window from a display panel to another display panel. Players may access a series of game menus by touching menu tabs located on the Universal Player Control. Once a game menu is opened, players may use the jog wheel within the Universal Player Control to navigate and the button at the center of the Universal Player Control to make selections. A "resize" function may be activated by pressing a tab menu and the resizing (larger or smaller) of the parent window may be controlled by the jog wheel. A "skin" function may be activated by pressing a tab menu and a series of predetermined style appearances (or skin, from a library of skins prepared by graphic artists for example) of the parent window may successively be rendered by whirling around the jog wheel, and then when the player find a pleasant skin, he or she may press the central button to retain that configuration.

Other effects may be selected such as diming, animation, temporary hiding or overlapping, either via appropriate design tools interactively controlled using the invention or via selection of pre-constructed effects from a library of effects developed by graphic or animation artists.

The configurations selected via the Universal Player Control may advantageously be stored in a player profile for later retrieval. Player profile storage and retrieval may use any means of storing player profile, including central server, peer-to-peer and personal physical removable storage instrument.

Accordingly, an embodiment of the present inventions is a universal player control rendered on a video display of a pay-for-play or of a pay-for-wager video game to enable a player to interactively control predetermined game parameters or game actions via player activation using a pointer (e.g., the player's finger or other device). The universal player control may include and/or be configured with a ring area delimited by an outer circular perimeter and an inner circular perimeter, a first continuously variable signal being generated as a function of an arc or circular motion activation within the ring area; a central area within the inner circular perimeter, a second continuously variable signal being generated as a function of the activation time of the central area, and predetermined first selection areas within the ring area, each of the predetermined first selection areas generating a third continuously variable signal as a function of an activation time thereof.

The central area may be further configured to generate a fourth continuously variable signal as a function of a motion activation thereof. The universal player control may be configured to be displaced by the fourth continuously variable signal to track the motion activation of the central area, the central area following the pointer. Predetermined second areas may be provided outside the outer circular perimeter, and a fifth continuously variable signal may be generated as a function of an activation time of any one of the predetermined second areas. The predetermined second areas may be disposed radially outside the outer circular perimeter. Predetermined graphic assets may be disposed outside the outer circular perimeter, and a continuously variable graphic asset signal may be generated as a function of the activation time of each activated graphic asset. The predetermined graphic assets may be disposed radially outside the outer circular perimeter. The graphics assets may include one or more of a directional symbol, a menu selection symbol, a color selection symbol, a volume control symbol, a resize symbol, a hide symbol, an un-hide symbol, and an immediate action symbol, to identify but a few of the limitless possibilities. The universal player control may be further configured to control one nor more of a plurality of graphic assets rendered on the video display, to (for example) selectively resize, move, hide or reveal the at least one of the plurality of graphic assets, to select a skin for the at least one of the plurality of graphic assets and to select an action from a menu of actions to operate on the at least one of the plurality of graphic assets. Each of the plurality of predetermined graphic assets rendered on the video display may be controlled by a separate universal player control. The universal player control may be further configured to present the menu of actions in, for example, a vertical plane format, a list format, a fan format, a grid format and a tabular, to list but a few possibilities. The menu of actions may include, for example, resize a graphics asset, minimize a graphics asset, view a paytable of the game, adjust properties of the universal player control, change skin of the game, cash out, volume control, and help. Subsequent to activating a list menu of the menu of actions presented in the list format, the first continuously variable signal may control the cursor up or down the menu list. The volume control symbol may be rendered at a predetermined location on the video display and may be configured such that, subsequent to being activated by the player, volume of sound delivered from speakers coupled to the video game is controlled by the first continuously variable signal.

One or more of the first, second and third continuously variable signals may be configured to control, for example, one or more of an amplitude, a magnification, a displacement direction of at least one of a plurality of graphic assets disposed outside of the outer circular perimeter, a scanning or a lookup through a list rendered outside of the outer circular perimeter, for example. The first continuously variable signal, the second continuously variable signal and/or the third continuously variable may be configured to trigger different actions depending upon an actuation motion of the pointer by the player.

According to another embodiment thereof, the present invention is a gaming machine, comprising a video display; a universal player control rendered on the video display, the universal player control being configured to enable a player to interactively control predetermined game parameters or game actions via player activation, the universal player control comprising: a ring area delimited by an outer circular perimeter and an inner circular perimeter, a first continuously variable signal being generated as a function of an arc or circular motion activation within the ring area; a central area within the inner circular perimeter, a second continuously variable signal being generated as a function of the activation time of the central area, and predetermined first selection areas within the ring area, each of the predetermined first selection areas generating a third continuously variable signal as a function of an activation time thereof.

According to further embodiments, the central area may further generate a fourth continuously variable signal as a function of a motion activation thereof. The universal player control may be configured to be displaced by the fourth continuously variable signal to track the motion activation of the central area, the central area following the pointer. The universal player control may further include predetermined second areas outside the outer circular perimeter, a fifth continuously variable signal being generated as a function of an activation time of any one of the predetermined second areas. The predetermined second areas may be disposed radially outside the outer circular perimeter. Predetermined graphic assets may be rendered on the video display and may be disposed outside the outer circular perimeter, a continuously variable graphic asset signal being generated as a function of the activation time of each activated graphic asset. The predetermined graphic assets may be disposed radially outside the outer circular perimeter. The graphics assets may include one or more of a directional symbol, a menu selection symbol, a color selection symbol, a volume control symbol, a resize symbol, a hide symbol, an un-hide symbol (e.g., reveal a previously hidden symbol), and an immediate action symbol, for example. The universal player control may be further configured, for example, to control a plurality of graphic assets rendered on the video display, to selectively resize, move, hide or reveal the at least one of the plurality of graphic assets, to select a skin for the at least one of the plurality of graphic assets and to select an action from a menu of actions to operate on the graphic assets. Each of a plurality of predetermined graphic assets rendered on the video display may be controlled by a separate universal player control. The universal player control may be further configured to present the menu of actions in, for example, a vertical plane format, a list format, a fan format, a grid format and a tabular. The menu of actions may include, for example, a resize a graphics asset, minimize a graphics asset, view a paytable of the game, adjust properties of the universal player control, change skin of the game, cash out, volume control, and help. Subsequent to activating a list menu of the menu of actions presented in the list format, the first continuously variable signal may control the cursor up or down the menu list. A volume control symbol may be rendered at a predetermined location on the video display, the volume control symbol being configured such that, subsequent to being activated by the player, volume of sound delivered from speakers coupled to the video game may be controlled by the first continuously variable signal. At least one of the first continuously variable signal, the second continuously variable signal and the third continuously variable signal may be configured to control one or more of, for example, an amplitude, a magnification, a displacement direction of at least one of a plurality of graphic assets disposed outside of the outer circular perimeter, and a scanning or a lookup through a list rendered outside of the outer circular perimeter. The first, second and/or third continuously variable signal may be configured to trigger different actions depending upon an actuation motion by the player.

DETAILED DESCRIPTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
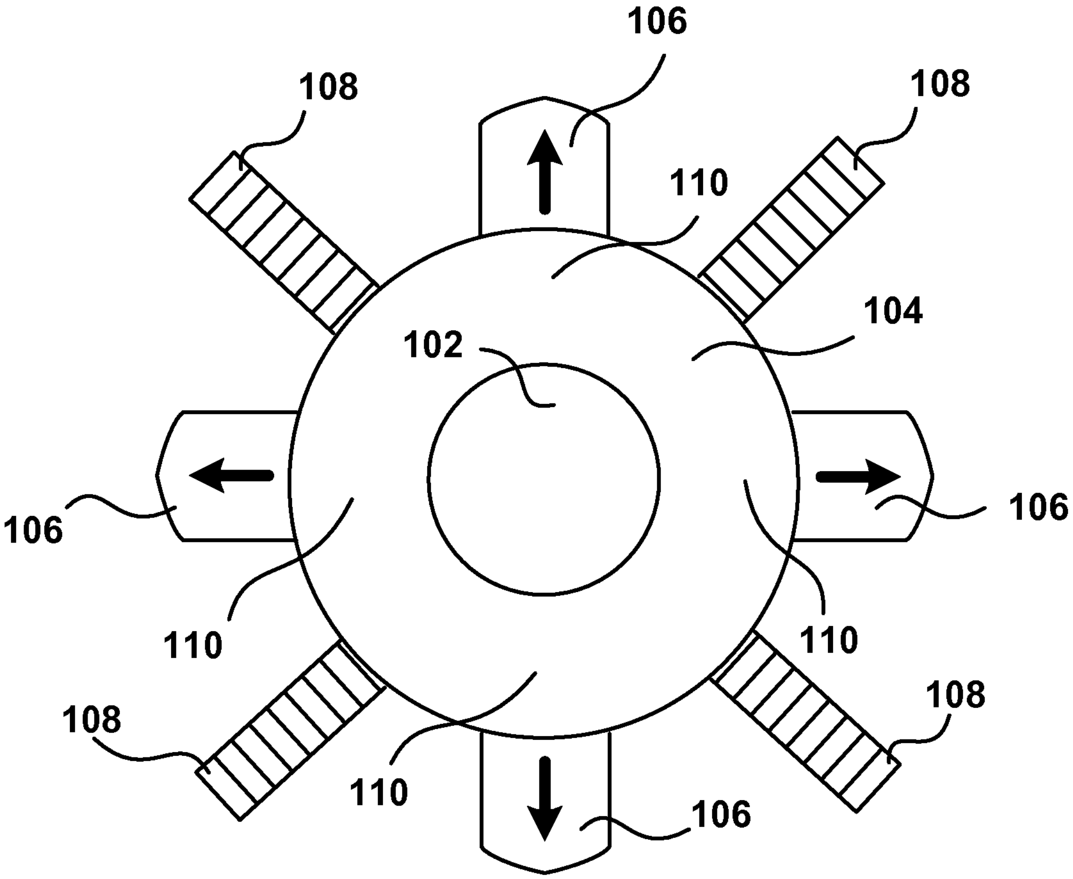
FIG. 1 depicts an embodiment of a Universal Player Control, according to an embodiment of the present invention.

FIG. 1 depicts a pop-up Universal Player Control 102, according to an embodiment of the present invention. The central control button 102 may (but need not) be located at the center of the Universal Player Control. Players may use the central control button to move the Universal Player Control (either within its parent window or outside of its parent window) and to select options during menu navigation. A ring area or jog wheel 104 is situated around the central control button 102. Players may drag a finger in a circular motion around the ring area 104 like a jog wheel. Players may use the jog wheel to scroll through menus, either backward or forward (or up or down, side to side, etc.) by, for example, moving a finger around the wheel's arc. On or near the outer portion of the Universal Player Control (such as around the perimeter of the ring area 104, for example), four or more directional buttons 106 may be provided. Such directional buttons 106 may be configured to allow players to move the Universal Player Control's parent (associated) window. The areas 110 on the ring area immediately near the directional buttons 106 may be configured to respond identically to the directional buttons, that is, when selected with no arc or circular motion (i.e. no dragging), these areas will respond with a corresponding directional effect (i.e., up, down, right, left). In addition to these directional buttons, the outer portion of the Universal Player Control may also include menu tabs 108. The menu tabs 108 may be configured, for example, to enable players to touch one of the various menu tabs 108 and be presented with a list of menus to navigate. Each or selected ones of the menus may have submenus.

Each zone on the universal player control may be configured to generate three continually variable signals when activated by the player via a pointer or pointing device (e.g. a mouse click or drag, a finger press or drag a touch screen). A 2-axis XY continuously variable signal is produced as a function of the activation displacement (or drag) and a one-axis T continuously variable signal is produced as a function of the activation (click, press or drag) duration. The signals produced by a motion activation (a finger drag for example) of a predetermined zone may be configured to control the universal player control to be displaced such as to track the activation location (track the finger drag). The signals produced by an arc or a circular motion activation of the ring area (a finger drag over the ring area for example) may be configured to control an increasing signal or a decreasing signal, or alternatively a look-up up or down into a list of items as a function of the arc of circular motion. For example, dragging the ring in one direction may increase the sound volume, and dragging in the reverse direction may decrease the sound volume. For example again, dragging the ring in one direction may allows to scroll up a long list of items, and scroll down the list when dragging in the opposite direction. The signals produced by a non-motion activation (a finger press for example) of a predetermined zone may be configured to control the universal player control to induce a continuous action, for example moving a predetermined graphics asset in the upward direction when pressing the up directional triangle. Similarly, the signals produced by a temporary non-motion activation (a short finger press for example) of a predetermined zone may be configured to control the universal player control to induce an immediate selection action (e.g. selecting a menu).It should be cautioned that the present Universal player Control is not to be construed to be limited to the specific embodiments shown in the drawings, as the appearance and layout thereof may be freely chosen based on functionality, ease of use, design and/or artistic considerations, as those of skill in this art may appreciate. Accordingly, terms such as "upper", "lower", "inner", "outer", "top", "side", "bottom" "inwardly", "outwardly", "around", "perimeter", "center", "ring", "annular" and like qualifiers used herein refer to the positions of the respective elements shown on the accompanying drawing figures and the present inventions are not necessarily limited to such positions. Moreover, when a specific number of elements is mentioned relative to the drawings, the present inventions are not to be limited thereby. For example, the Universal player Control of FIG. 1 may well be configured with a greater or lesser number of menu tabs and/or other features. Moreover, the dominant shape within the present Universal Player Controls need not be a circle, but may be any shape (regular or otherwise), subject to ease of use considerations, among others.

Figure 2:
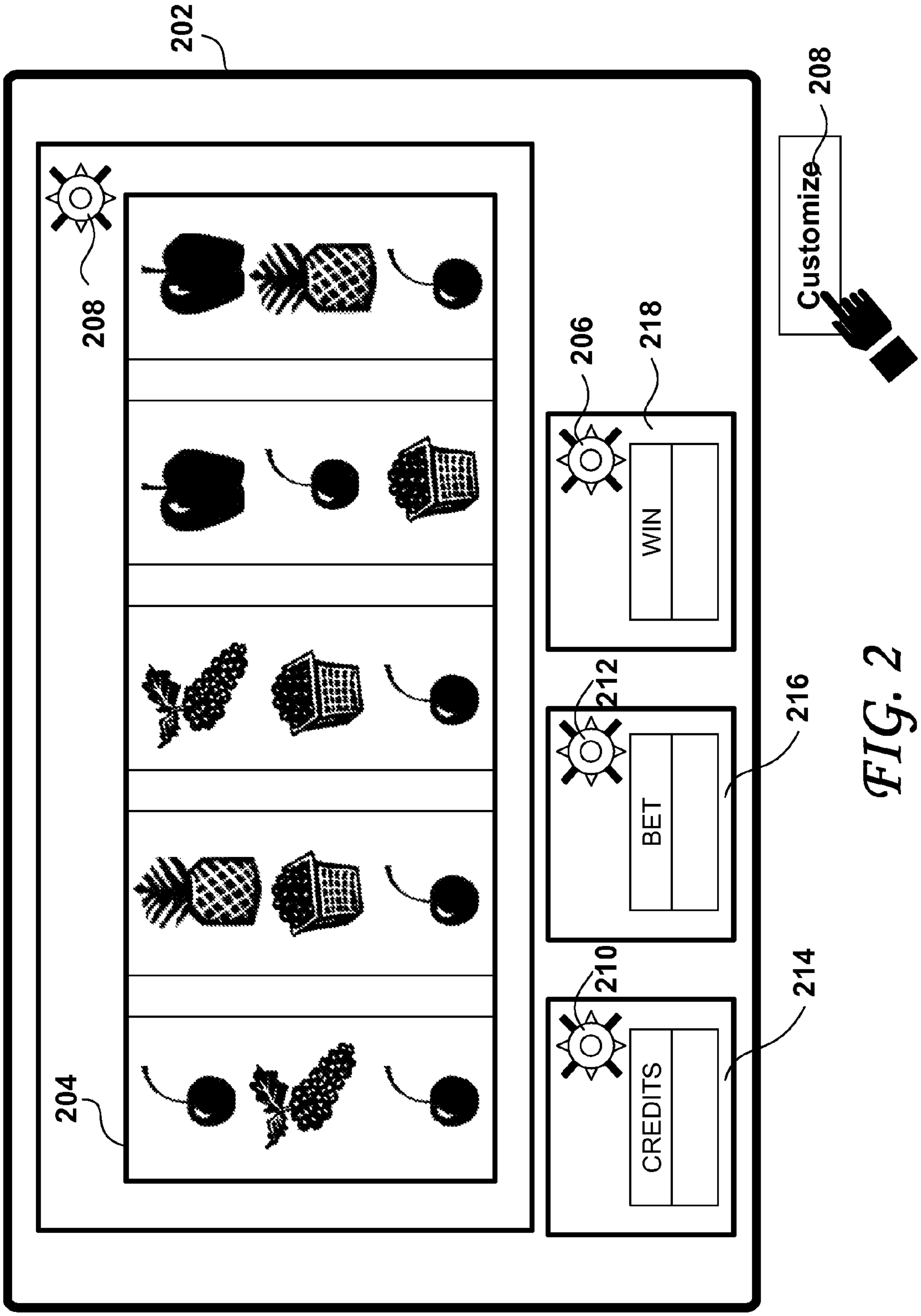
FIG. 2 illustrates how players may make a Universal Player Controls visible by pressing the “customize” button, according to an embodiment of the present invention.

FIG. 2 illustrates the functionality that enables players to make Universal Player Controls visible by pressing the "customize" button or alternatively by pressing another predetermined area on the display touch screen, according to further embodiments of the present invention. Each primary gaming screen 202 may include of one or more groups of graphics assets aggregated within windows 204, 214, 216, 218 that may be shaped as desired (e.g., rectangular, round, elliptical or otherwise, including irregularly shaped windows). Each window 204, 214, 216, 218, aggregate of graphics assets, or entire layout 202 may have a Universal Player Control 206, 208, 210, 212 associated therewith. Such Universal Player Controls may be initially hidden or hidden by default, but players may make them visible by pressing the "customize" button 208 or by pressing another predetermined area on the display touch screen.

After the customize button 208 has been pressed, players may select which window 204, 214, 216 or 218 they wish to manipulate. Players may touch a selected Universal Player Control 208, 210, 212 or 206 and drag it to a desired location within the gaming screen. Players may hide the Universal Player Controls 208, 210, 212, 206 by pressing the customize button 208 when the Universal Player Controls 208, 210, 212, 206 are visible on the gaming screen or may cause any one of the Universal Player Controls 208, 210, 212, 206 to become hidden (or to assume a selective degree of transparency) or otherwise de-emphasized by double-clicking the center button thereof, for example.

In some embodiments of the invention, the "customize" button 208 may also function as a "hide" button, such that the button 208 reads "customize" when Universal Player Controls 208, 210, 212, 206 are displayed and reads "hide" when they are not.

Figure 3:
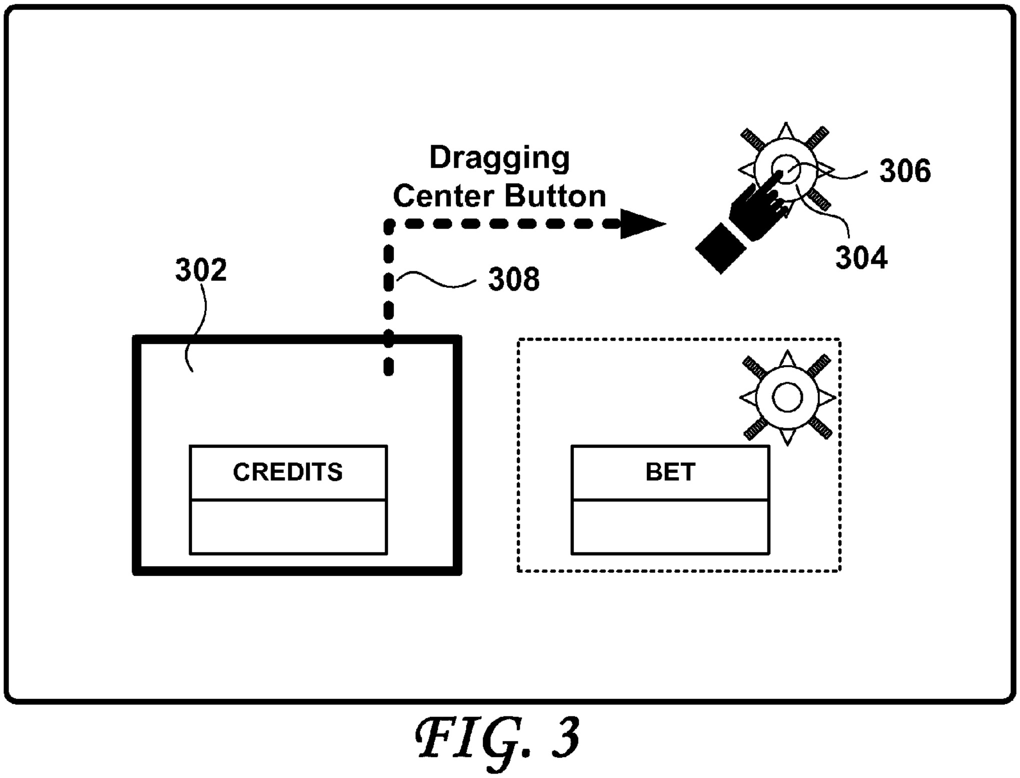
FIG. 3 illustrates how players may move a Universal Player Control by pressing the button at its center and “dragging” it across the gaming screen, according to an embodiment of the present invention.

FIG. 3 illustrates how players may move a Universal Player Control by pressing the button 306 at its center and "dragging" it across the gaming screen. When pressing the button 306 initially at its center, the Universal Player Control 304 may automatically increase in size such that its constituents are more visible and large enough such as to allow a player to interact with each constituent graphic asset via the pointing device. Every window 302, selected ones of the windows or predetermined aggregate (grouping) of graphic assets within the gaming screen may be provided a Universal Player Control 304. Players may move a control by touching the button 306 at its center and dragging it as shown at 308 across the gaming screen just as they might drag an item on a computer screen using a mouse or other pointing device.

Figure 4:
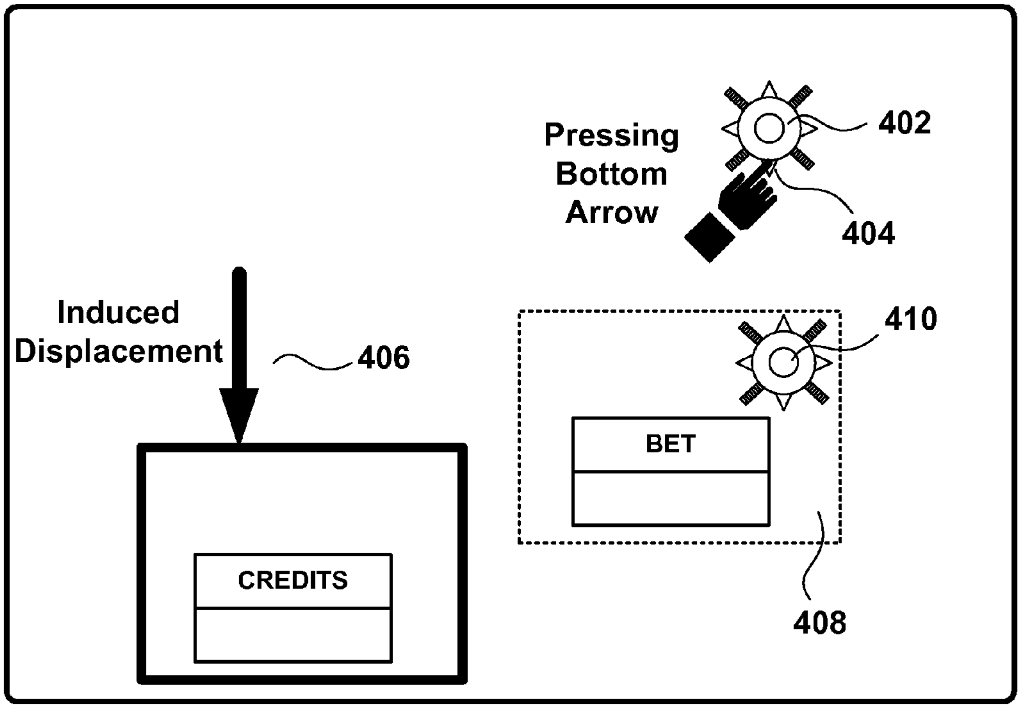
FIG. 4 illustrates how players may move a window by pressing a directional arrow within a Universal Player Control, according to an embodiment of the present invention.

FIG. 4 illustrates the functionality of the present Universal Player Controls that enables players to move a parent window or predetermined aggregate of graphic assets by pressing a directional arrow within the Universal Player Control. Once a player has activated a Universal Player Control 402, he or she may use one or more of its directional buttons 404 (the bottom arrow is being pressed in FIG. 4) to move the control's parent window (the window that is associated with the Universal Player Control) around the gaming screen 406 (induced vertical downward motion 406 in the illustration). Once the displacement of the parent window is triggered, the player may swirl his finger over the jog wheel ring 104 to accelerate the displacement and obtain two directions by swirling clockwise or anticlockwise. It should be noted that other windows 408 within the gaming screen do not move during this action, as their associated Universal Player Control 410 were not touched and are not affected by action on the Universal Player Control associated with another window. It should also be noted that diagonal movement may be made possible by touching two directional arrows at the same time (when using a multi-touch touch-screen). Furthermore, it should be noted that a given Universal Player Control may be associated with more than one window or other graphic asset or grouping of graphic assets on the screen, as suggested above.

In a multi-display gaming machine, the Universal player Controls (or selected ones thereof) may be configured so as to enable players to move the parent window or predetermined aggregate of graphic assets from a first display panel to a second display panel.

A "resize" function may be activated by pressing a tab menu (denoted by reference numeral 108 in FIG. 1) and then using the jog wheel 104 to resize (make larger or smaller) the parent window. A "skin" function may also be activated by pressing a tab menu. Once the game is in skin selection mode, the player may use the jog wheel 104 to preview appearance styles (as the player's finger whirls around the jog wheel new skins appear onscreen) and the central button 102 to retain a desired skin.

Figure 5:
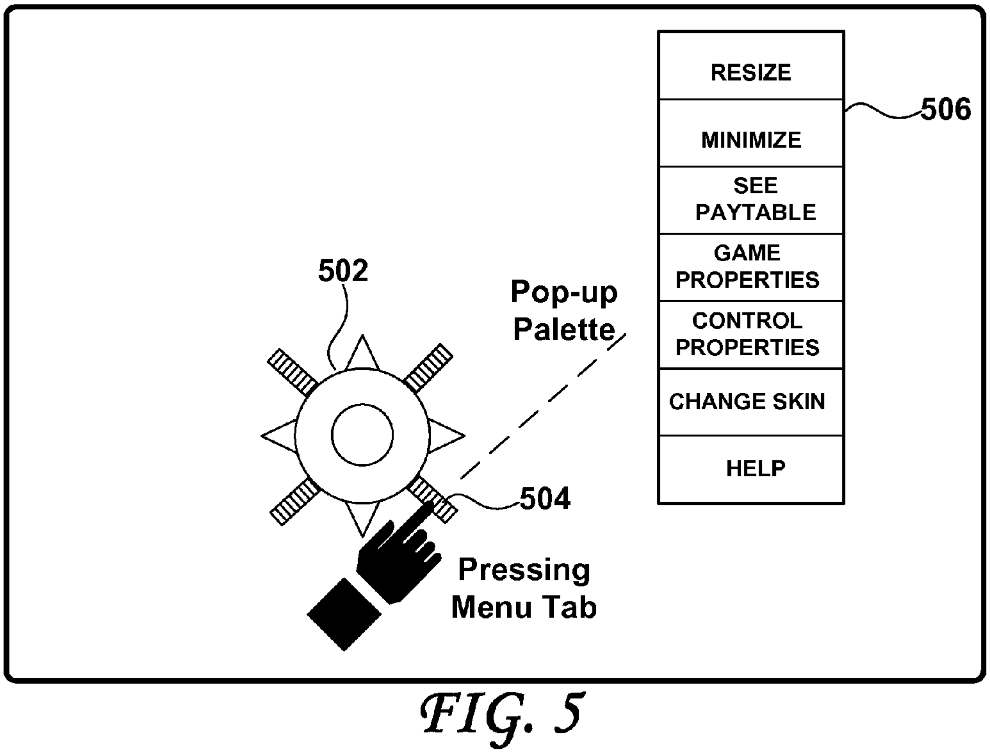
FIG. 5 illustrates how players may access game menus by pressing a menu tab within a Universal Player Control, according to an embodiment of the present invention.

FIG. 5 illustrates the functionality that enables players to access game menus by pressing a menu tab within the Universal Player Control, according to further embodiments of the present invention. According to this embodiment, when players touch a menu tab 504 on the Universal Player Control 502, a game menu 506 may become visible. Game menus may have a number of different appearance styles including flat, grid, and fan style. Such a game menu may include a plurality of player-selectable controls such as, for example, "Resize", "Minimize", "See Paytable", "Game Properties", "Control Properties", "Change Skin" and/or "Help."

Figure 6:
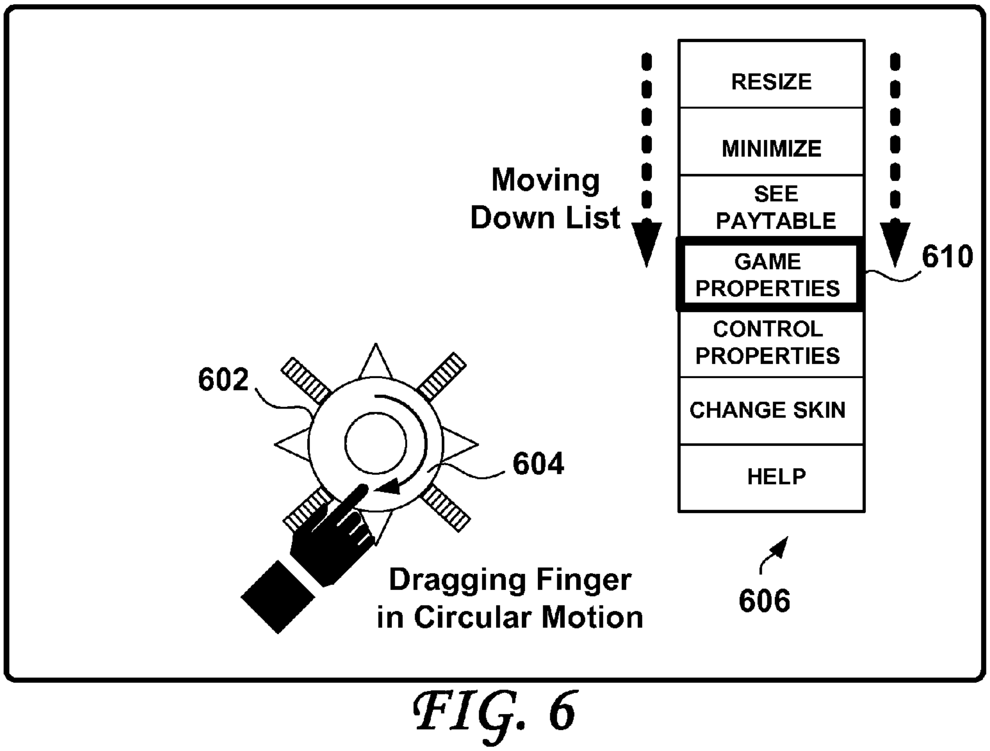
FIG. 6 illustrates how players may use the jog wheel within a Universal Player Control to navigate game menus, according to an embodiment of the present invention.

FIG. 6 illustrates the functionality that enables players to use the jog wheel 604 within the Universal Player Control 602 to navigate game menus. After a game menu 606 has been opened (in the manner shown in FIG. 5, for example), players may navigate through the selections thereof by tracing their finger around arc of the jog wheel 604, with clockwise motions (for example) to navigate a cursor 610 downward within the game menu 606 and counterclockwise motions (for example) to navigate the cursor 610 upward within the game menu 606. When a player has positioned the cursor 610 over a desired selection, he or she may press the central control button of the Universal player Control 602 to select it, or alternatively press the desired selection. The above functionality may be advantageously applied with a menu 606 having a substantially long list of items to choose from, and wherein the complete list may not fit on the screen or may not be viewed in its entirety. In that case, the list may automatically scroll up or down as the cursor 610 reaches the top or the bottom of the portion of the visible list to reveal the hidden menu items.

Figure 7:
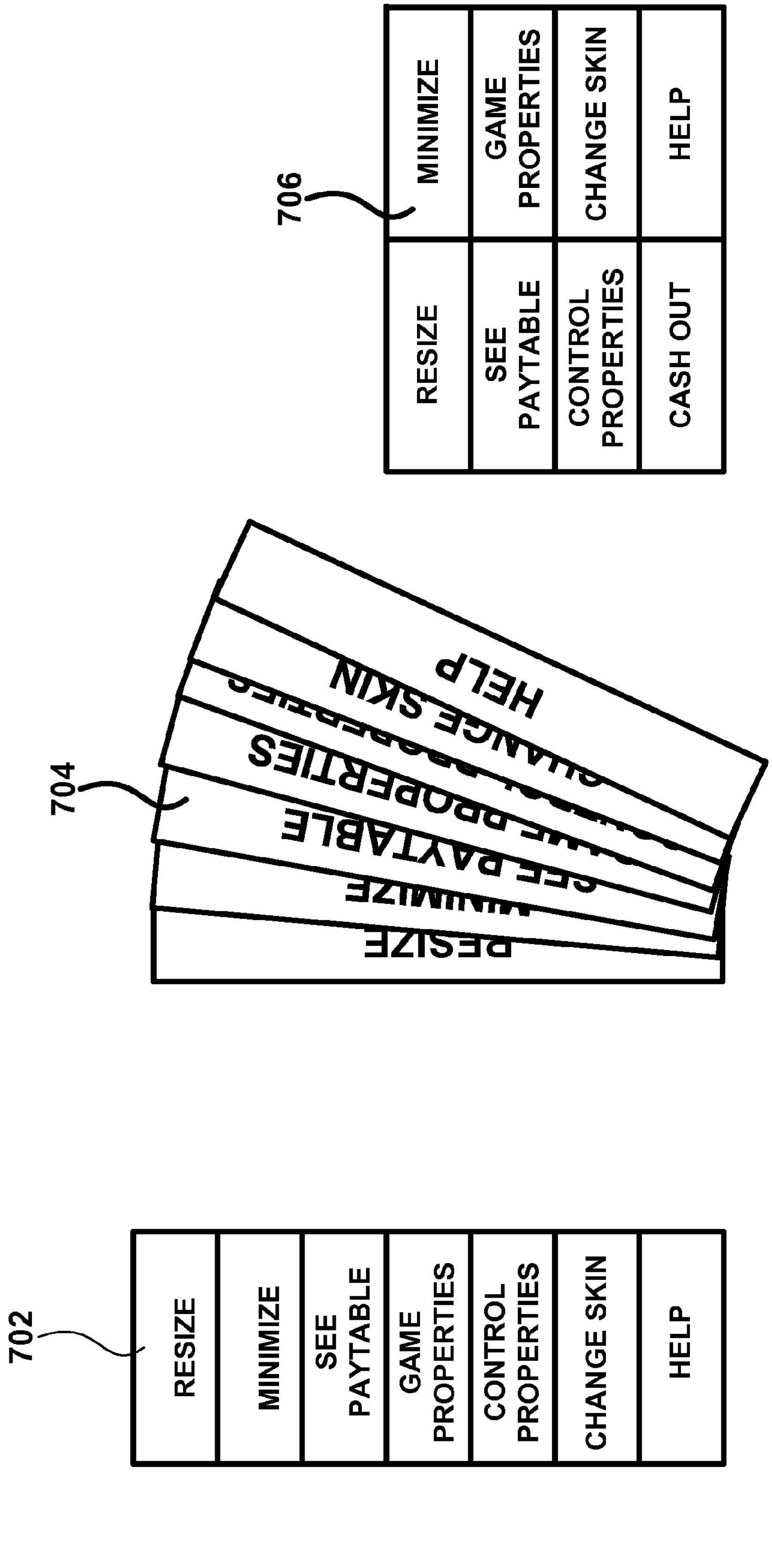
FIG. 7 depicts three possible game menu appearance styles, according to further embodiments of the present invention.

FIG. 7 depicts three of many possible appearance styles for the game menus shown in FIGS. 5 and 6, according to further embodiments of the present invention. The flat 702 menu style allows for players to navigate menu options on a vertical plane. The fan 704 menu style features menu options configured horizontally with some overlap from one option to another. This overlap makes the fan style menu compact but somewhat harder to read than the flat menu style; it is however intuitive when selecting colors. The grid 706 menu style allows for player to navigate menu options around a grid. Other configurations for the game menus are possible and may be implemented within the scope of the present inventions.

Possible player options included within game menus may include (but are not limited to): resizing windows, minimizing windows, seeing the game's paytable, adjusting game properties, adjusting the control's properties, changing a game's skin, cashing out, and seeking help.

Figure 8:
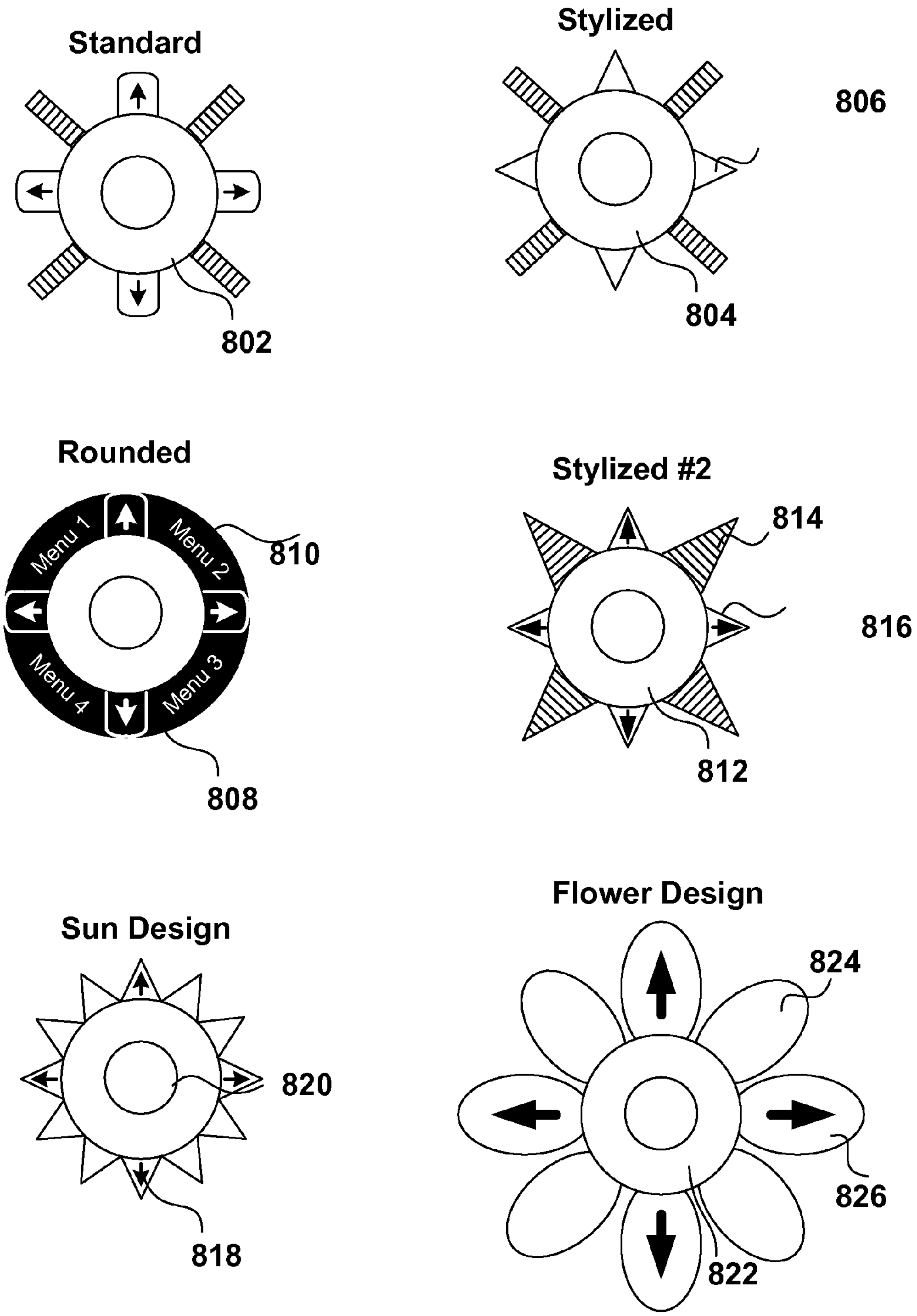
FIG. 8 depicts six possible Universal Player Control appearance styles, according to still further embodiments of the present invention.

FIG. 8 depicts six exemplary ones of a near limitless number of possible Universal Player Control appearance styles, according to further embodiments of the present invention. The Universal Player Control 802 features the control button, jog wheel, directional buttons, and menu tabs that have been depicted in earlier figures. One alternate embodiment of the Universal Player Control is the stylized control 804. The stylized control features pointed barbs 806 that act as its directional buttons. Another embodiment of the Universal Player Control is the rounded control 808. The rounded control features curved menu tabs 810 that surround the jog wheel instead of radiating outward. The stylized control #2 812 is an alternate version of the stylized control that features pointed menu tabs 814 and barbed radial directional buttons featuring arrows 816. The sun design control 818 features four extra menu tabs 820 so that it has a stylized, sun-like appearance. The flower design control 822 features oval menu tabs 824 and oval directional buttons 826 so that it has a flower-like appearance. The menu tabs 108 814 may advantageously have repetitive lines across to intuitively suggest that a menu in a list format is associated (no lines across would intuitively suggest that the tab induces a single action).

The configurations selected via the universal player control may advantageously be stored in a player profile then retrieved later. Player profile storage and retrieval may use any means of storing player profile, including central server, peer-to-peer and personal physical removable storage instrument. A player-selected Universal Player Control may then be stored in the player's profile and be recalled when the player next plays on the same or a different gaming machine that supports the use of such Universal Player Controls. While the foregoing detailed description has described several embodiments of this invention, it is to be understood that the above description is illustrative only and not limiting of the disclosed invention. For example, while sun and flower shaped Universal Player Controls were described, controls might be shaped like stars, ringed planets, rainbows, or crosses. Indeed, a number of modifications will no doubt occur to persons of skill in this art. All such modifications, however, should be deemed to fall within the scope of the present invention.

What is claimed is:

1. A universal player control rendered on a video display of a pay-for-play or of a pay-for-wager video game for enabling a player to interactively control game parameters or game actions via player activation using a pointer, comprising:

a ring area delimited by an outer circular perimeter and an inner circular perimeter, a first continuously variable signal being generated as a function of an arc or circular motion activation within the ring area;

a central button area within the inner circular perimeter, a second continuously variable signal being generated as a function of an activation time of the central button area, and first selection areas within the ring area, each of the first selection areas generating a third continuously variable signal as a function of an activation time thereof.

2. The universal player control of claim 1, wherein the central area is further configured to generate a fourth continuously variable signal as a function of a motion activation thereof.

3. The universal player control of claim 2, wherein the universal player control is configured to be displaced by the fourth continuously variable signal to track the motion activation of the central area, the central area following the pointer.

4. The universal player control of claim 1, further comprising second areas outside the outer circular perimeter, a fifth continuously variable signal being generated as a function of an activation time of any one of the second areas.

5. The universal player control of claim 4, wherein the second areas define longitudinal axes that extend in a radial direction outside the outer circular perimeter.

6. The universal player control of claim 1, further comprising graphic assets disposed outside the outer circular perimeter, a continuously variable graphic asset signal being generated as a function of the activation time of each activated graphic asset.

7. The universal player control of claim 6, wherein the graphic assets are disposed radially outside the outer circular perimeter.

8. The universal player control of claim 6, wherein the graphics assets include at least one of a directional symbol, a menu selection symbol, a color selection symbol, a volume control symbol, a resize symbol, a hide symbol, an un-hide symbol, and an immediate action symbol.

9. The universal player control of claim 1, further configured to control at least one of a plurality of graphic assets rendered on the video display, to selectively resize, move, hide or reveal the at least one of the plurality of graphic assets, to select a skin for the at least one of the plurality of graphic assets and to select an action from a menu of actions to operate on the at least one of the plurality of graphic assets.

10. The universal player control of claim 1, wherein each of a plurality of graphic assets rendered on the video display is controlled by a separate universal player control.

11. The universal player control of claim 9, wherein the universal player control is further configured to present the menu of actions in at least one of a vertical plane format, a list format, a fan format, a grid format and a tabular.

12. The universal player control of claim 11, wherein the menu of actions includes at least one of resize a graphics asset, minimize a graphics asset, view a paytable of the game, adjust properties of the universal player control, change skin of the game, cash out, volume control, and help.

13. The universal player control of claim 12, wherein subsequent to activating a list menu of the menu of actions presented in the list format, the first continuously variable signal controls the cursor up or down the menu list.

14. The universal player control of claim 1, wherein a volume control symbol is rendered at a location on the video display, the volume control symbol being configured such that, subsequent to being activated by the player, volume of sound delivered from speakers coupled to the video game is controlled by the first continuously variable signal.

15. The universal player control of 1, wherein at least one of the first continuously variable signal, the second continuously variable signal and the third continuously variable signal is configured to control at least one of an amplitude, a magnification, a. displacement direction of at least one of a plurality of graphic assets disposed outside of the outer circular perimeter, a scanning or a lookup through a list rendered outside of the outer circular perimeter.

16. The universal player control of claim 12, wherein at least one of the first continuously variable signal, the second continuously variable signal and the third continuously variable is configured to trigger different actions depending upon an actuation motion by the player.

17. A gaming machine, comprising:

a video display;

a universal player control rendered on the video display, the universal player control being configured to enable a player to interactively control game parameters or game actions via player activation, the universal player control comprising:

a ring area delimited by an outer circular perimeter and an inner circular perimeter, a first continuously variable signal being generated as a function of an arc or circular motion activation within the ring area;

a central button area within the inner circular perimeter, a second continuously variable signal being generated as a function of an activation time of the central button area, and first selection areas within the ring area, each of the first selection areas generating a third continuously variable signal as a function of an activation time thereof.

18. The gaming machine of claim 17, wherein the central area further generates a fourth continuously variable signal as a function of a motion activation thereof.

19. The gaming machine of claim 18, wherein the universal player control is configured to be displaced by the fourth continuously variable signal to track the motion activation of the central area, the central area following the pointer.

20. The gaming machine of claim 17, further comprising second areas outside the outer circular perimeter, a fifth continuously variable signal being generated as a function of an activation time of any one of the second areas.

21. The gaming machine of claim 20, wherein the second areas define longitudinal axes that extend in a radial direction outside the outer circular perimeter.

22. The gaming machine of claim 17, further comprising graphic assets rendered on the video display and disposed outside the outer circular perimeter, a continuously variable graphic asset signal being generated as a function of the activation time of each activated graphic asset.

23. The gaming machine of claim 22, wherein the graphic assets are disposed radially outside the outer circular perimeter.

24. The gaming machine of claim 22, wherein the graphics assets include at least one of a directional symbol, a menu selection symbol, a color selection symbol, a volume control symbol, a resize symbol, a hide symbol, an un-hide symbol, and an immediate action symbol.

25. The gaming machine of claim 17, wherein the universal player control is further configured to control at least one of a plurality of graphic assets rendered on the video display, to selectively resize, move, hide or reveal the at least one of the plurality of graphic assets, to select a skin for the at least one of the plurality of graphic assets and to select an action from a menu of actions to operate on the at least one of the plurality of graphic assets.

26. The gaming machine of claim 17, wherein each of a plurality of graphic assets rendered on the video display is controlled by a separate universal player control.

27. The gaming machine of claim 25, wherein the universal player control is further configured to present the menu of actions in at least one of a vertical plane format, a list format, a fan format, a grid format and a tabular.

28. The gaming machine of claim 27, wherein the menu of actions includes at least one of resize a graphics asset, minimize a graphics asset, view a paytable of the game, adjust properties of the universal player control, change skin of the game, cash out, volume control, and help.

29. The gaming machine of claim 28, wherein subsequent to activating a list menu of the menu of actions presented in the list format, the first continuously variable signal controls the cursor up or down the menu list.

30. The gaming machine of claim 17, further including a volume control symbol rendered at a location on the video display, the volume control symbol being configured such that, subsequent to being activated by the player, volume of sound delivered from speakers coupled to the video game is controlled by the first continuously variable signal.

31. The gaming machine of claim 17, wherein at least one of the first continuously variable signal, the second continuously variable signal and the third continuously variable signal is configured to control at least one of an amplitude, a magnification, a displacement direction of at least one of a plurality of graphic assets disposed outside of the outer circular perimeter, and a scanning or a lookup through a list rendered outside of the outer circular perimeter.

32. The gaming machine of claim 17, wherein at least one of the first continuously variable signal, the second continuously variable signal and the third continuously variable is configured to trigger different actions depending upon an actuation motion by the player.

* * * * *